(12) United States Patent
Smaldone et al.

(10) Patent No.: US 9,454,321 B1
(45) Date of Patent: Sep. 27, 2016

(54) WORKLOAD-DRIVEN STORAGE CONFIGURATION MANAGEMENT

(71) Applicant: EMC Corporation, Hopkinton, MA (US)

(72) Inventors: Stephen D. Smaldone, Woodstock, CT (US); Hyong Shim, Basking Ridge, NJ (US); Jian Xing, Pleasanton, CA (US)

(73) Assignee: EMC Corporation, Hopkinton, MA (US)

(*) Notice: Subject to any disclaimer, the term of this patent is extended or adjusted under 35 U.S.C. 154(b) by 176 days.

(21) Appl. No.: 14/291,500

(22) Filed: May 30, 2014

(51) Int. Cl.
*G06F 3/06* (2006.01)

(52) U.S. Cl.
CPC ............ *G06F 3/0634* (2013.01); *G06F 3/061* (2013.01); *G06F 3/0653* (2013.01); *G06F 3/0671* (2013.01); *G06F 3/0674* (2013.01); *G06F 3/0631* (2013.01); *G06F 3/0665* (2013.01); *G06F 2003/0695* (2013.01)

(58) Field of Classification Search
CPC .... G06F 3/061; G06F 3/0614; G06F 3/0641; G06F 3/0647
USPC .................. 711/111, 112, 114, 161
See application file for complete search history.

(56) References Cited

U.S. PATENT DOCUMENTS

| | | | |
|---|---|---|---|
| 6,912,635 B2* | 6/2005 | Patterson et al. | 711/165 |
| 2007/0234148 A1* | 10/2007 | Fairhurst et al. | 714/724 |
| 2007/0271219 A1* | 11/2007 | Agarwal et al. | 707/2 |
| 2009/0106603 A1* | 4/2009 | Dilman et al. | 714/42 |
| 2012/0278578 A1* | 11/2012 | Castillo et al. | 711/165 |

* cited by examiner

*Primary Examiner* — Than Nguyen
(74) *Attorney, Agent, or Firm* — Blakely, Sokoloff, Taylor & Zafman LLP

(57) ABSTRACT

Exemplary methods for monitoring and improving performance at a storage system include analyzing storage performance statistics collected during operations of a storage system. In one embodiment, the methods include in response to determining storage performance satisfies a predetermined condition based on the analyzed storage performance statistics, determining one or more storage configuration suggestions that will likely improve the storage performance based on the analysis. In one embodiment, the methods include transmitting a first set of alerts to a user of the storage system indicating storage performance is poor under a current set of configurations based on the analysis, wherein at least one or more of the first set of alerts includes the one or more storage configuration suggestions to allow the user of the storage system to modify the current set of configurations in an attempt to improve the storage performance of the storage system.

36 Claims, 10 Drawing Sheets

WORKLOAD-DRIVEN STORAGE CONFIGURATION MANAGEMENT

FIELD

Embodiments of the invention relate to the field of storage systems; and more specifically, to monitoring and improving performance at a storage system.

BACKGROUND

One of the key criteria for a storage system, such as a primary storage system, backup storage system, specifically designed for the consumer or small-business market is that it is easy to setup, configure, and deploy with minimal overheads. Often times, this ease-of-use may be a more important requirement than the raw performance of the system. This implies, however, that customers are likely to blindly accept the default configurations of a system, which, in fact, does not match well with the statistics of their actual workloads. A conventional storage system does not provide a mechanism to check for poor performance that may result from such mismatched configuration, which can degrade customer experience with the storage system.

BRIEF DESCRIPTION OF THE DRAWINGS

Embodiments of the invention are illustrated by way of example and not limitation in the figures of the accompanying drawings in which like references indicate similar elements.

DESCRIPTION OF EMBODIMENTS

Figure 1:
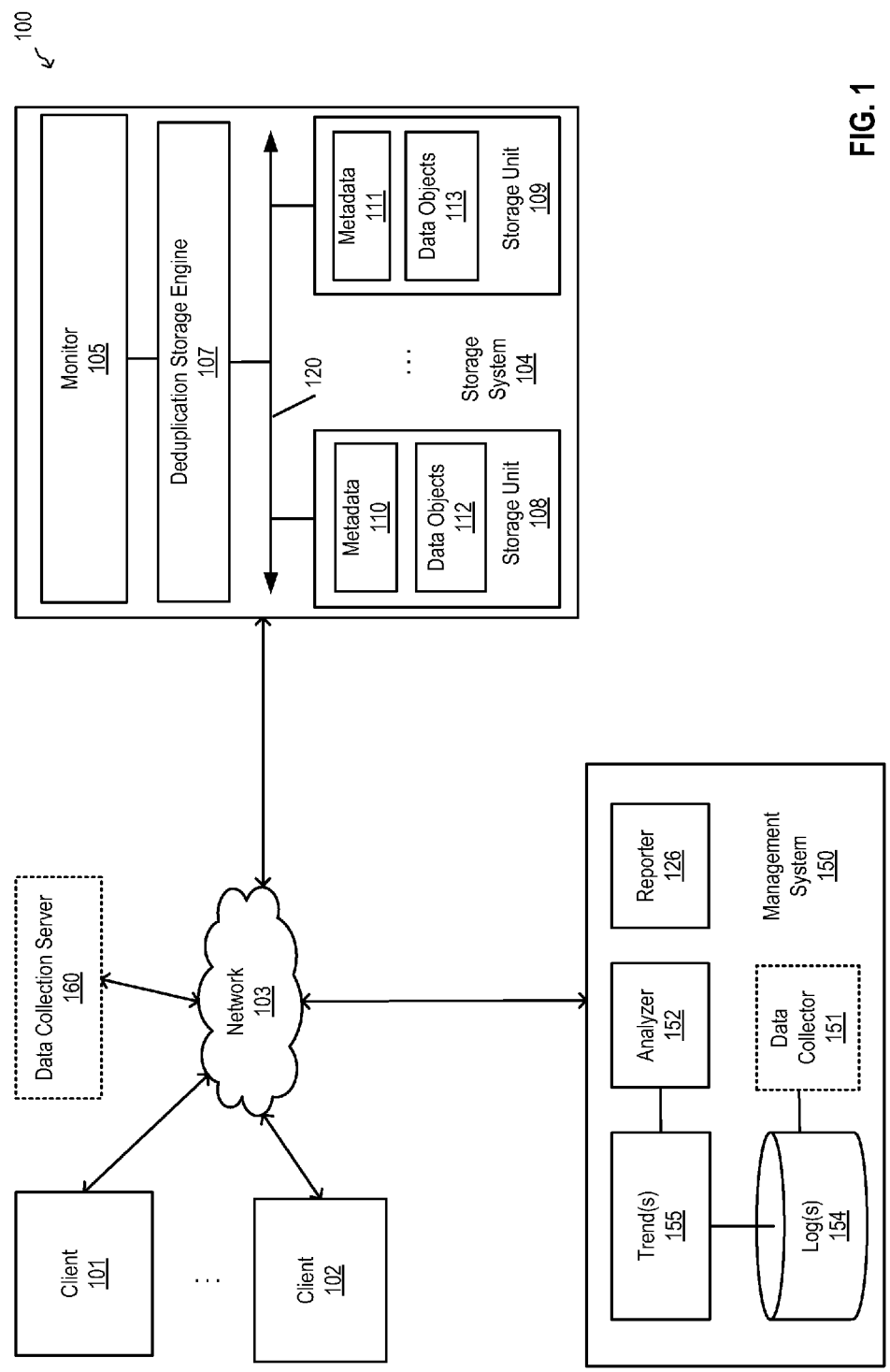
FIG. 1 is a block diagram illustrating a system according to one embodiment.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or statistic, but every embodiment may not necessarily include the particular feature, structure, or statistic. Moreover, such phrases are not necessarily referring to the same embodiment. Further, when a particular feature, structure, or statistic is described in connection with an embodiment, it is submitted that it is within the knowledge of one skilled in the art to affect such feature, structure, or statistic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Techniques for monitoring and improving performance at a storage system are described herein. Conventionally, storage systems are deployed with default configurations, which may not be suitable for the actual workloads of the client/user. Such conventional storage systems do not provide a mechanism for detecting poor storage performance caused by the current storage system configurations (default or otherwise). As such, conventional storage systems fail to proactively alert the user of possible misconfigurations.

Embodiments of the present invention overcome these limitations by including a monitor at a storage system. In one embodiment, the monitor is configured to monitor various storage performance statistics at the storage system, including, for example, input/output (IO) request service times, average IO throughput, average IO operations per second, IO request queue lengths, deduplication rates, compression rates, block misalignment rates, or a combination thereof. These storage performance statistics are described in further details below. In one embodiment, the monitored storage performance statistics are sent to a data collection server and/or a data collector of a management system, to be analyzed.

According to one embodiment, an analyzer at the management system analyzes the collected storage performance statistics to determine whether one or more storage configurations at the storage system should be modified in order to improve performance of the storage system. In response to determining one or more aspects of the storage performance is not performing well, the analyzer generates and sends one or more alerts to an alert reporter. The alerts may include one or more remedial measures recommending the user to change one or more of the current user configurations to improve storage performance.

In one embodiment, the analyzer processes each collected statistic and instantaneously provides an alert. In another embodiment, the analyzer takes a less reactive approach. In one such embodiment, the analyzer processes the storage performance statistics to generate trends. For example, the analyzer analyzes historical storage performance statistics over a predetermined period of time to determine the current performance behavior, and based on the current behavior, predicts/extrapolates what the performance behavior will be like in the near future. In such an embodiment, the analyzer is able proactively alert the user of a possible misconfiguration even before the storage performance suffers.

In one embodiment, for each alert, the alert reporter determines whether the alert is urgent, and if so, sends the urgent alert to a predetermined destination immediately. In this way, a user can take immediate actions to correct the misconfigurations that are causing the storage performance to suffer. In response to determining the alert is non-urgent, the reporter stores the alert so that it can be sent at a later time, for example, periodically and/or in response to a polling request.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Network 103 may be any type of networks such as a local area network (LAN), a wide area network (WAN) such as Internet, a corporate intranet, a metropolitan area network (MAN), a storage area network (SAN), a bus, or a combination thereof, wired and/or wireless.

Storage system 104 may include any type of server or cluster of servers. For example, storage system 104 may be a storage server used for any of various different purposes, such as to provide multiple users with access to shared data and/or to back up mission critical data. Storage system 104 may be, for example, a file server (e.g., an appliance used to provide network attached storage (NAS) capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage system 104 may have a distributed architecture, or all of its components may be integrated into a single unit. Storage system 104 may be implemented as part of an archive and/or backup system such as a deduplicating storage system available from EMC® Corporation of Hopkinton, Mass.

In one embodiment, storage system 104 includes, but is not limited to, deduplication storage engine 107, and one or more storage units 108-109 communicatively coupled to each other. Storage units 108-109 may be implemented locally (e.g., single node operating environment) or remotely (e.g., multi-node operating environment) via interconnect 120, which may be a bus and/or a network. In one embodiment, one of the storage units 108-109 operates as an active storage to receive and store external or fresh user data, while the other storage unit operates as a target storage unit to periodically archive data from the active storage unit according to an archiving policy or scheme. Storage units 108-109 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 108-109 may also be a combination of such devices. The storage units 108-109 may be organized into one or more volumes of Redundant Array of Inexpensive Disks (RAID).

In response to a data file to be stored in storage units 108-109, deduplication storage engine 107 is configured to segment the data file into multiple chunks according to a variety of segmentation policies or rules. Deduplication storage engine 107 may choose not to store a chunk in a storage unit if the chunk has been previously stored in the storage unit. In the event that deduplication storage engine 107 chooses not to store the chunk in the storage unit, it stores metadata enabling the reconstruction of the file using the previously stored chunk. As a result, chunks of data files are stored in a deduplicated manner, either within each of storage units 108-109 or across at least some of storage units 108-109. Data stored in the storage units may be stored in a compressed form (e.g., lossless compression: Huffman coding, Lempel-Ziv Welch coding; delta encoding: a reference to a chunk plus a difference; etc.). In one embodiment, different storage units may use different compression methods (e.g., main or active storage unit from other storage units, one storage unit from another storage unit, etc.).

The metadata, such as metadata 110-111, may be stored in at least some of storage units 108-109, such that files can be accessed independent of another storage unit. Metadata of each storage unit includes enough information to provide access to the files it contains. In one embodiment, metadata may include fingerprints contained within data objects 112-113, where a data object may represent a data chunk, a compression region (CR) of data chunks, or a container of one or more CRs. Fingerprints are mapped to a particular data object via metadata 110-111, enabling the system to identify the location of the data object containing a chunk represented by a particular fingerprint. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, the metadata information includes a file name, a storage unit where the chunks associated with the file name are stored, reconstruction information for the file using the chunks, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for chunks in storage units, identifying specific data objects).

In one embodiment, the storage system as shown in FIG. 1 may be used as a tier of storage in a storage hierarchy that comprises other tiers of storage. One or more tiers of storage in this hierarchy may utilize different kinds of storage devices and/or may be optimized for different statistics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system. Note that, as described further below, storage system 104 may be a primary storage system storing data from various end-user devices (e.g., in this scenario clients 101-102) or a backup storage system to backup data from one or more primary storage systems (e.g., in this scenario, clients 101-102 as primary storage systems).

In one embodiment, storage system 104 further includes monitor 105 configured to monitor/collect and transmit storage performance statistics of storage system 104 to management system 150 and/or data collection server 160 over network 103. In the example illustrated in FIG. 1, storage system 104 may be located at a client site and utilized by a client such as an enterprise or corporation, where the storage system 104 may be provided by a storage provider or vendor such as EMC Corporation. In one embodiment, management system 150 is associated with a storage provider or vendor that provides storage system 104 to a client. For example, management system 150 may be operated or owned by the storage provider or alternatively, it may be operated by a third-party vendor (e.g., a data collection agent) on behalf of the storage provider.

According to one embodiment, management system 150 includes data collector 151 configured to communicate with monitor 105 to collect storage performance statistics. Note that although one storage system is shown, data collector 151 may communicate with multiple monitors of multiple storage systems to collect storage performance statistics concerning the respective storage systems, which may be located at the same or different geographical locations (e.g., same or different client sites). In a configuration in which storage system 104 operates as a backup storage system for backing up data from multiple primary storage systems 101-102, management server 150 is configured to analyze statistics data collected from clients 101-102 and storage server 104, and based on the analysis, to provide recommendation regarding storage configurations to improve the performance of the systems 101-102 and 104. For example, management system 150 may be a centralized management server or cluster of servers for single or multiple clients or customers.

The collected storage performance statistics are stored in a storage device as part of logs 154. In one embodiment, analyzer 152 is to analyze storage performance statistics as they are being collected by data collector 151 in order to determine whether one or more of user configurations at storage system 104 should be modified in order to improve storage performance. Alternatively, or in addition to, analyzer 152 is to perform an analysis of storage performance statistics stored as part of logs 154. In some embodiments, analyzer 152 analyzes the storage performance statistics and "reacts" instantaneously by generating an alert if the storage performance is determined to be poor based on the sampled statistic. Alternatively, analyzer 152 is configured to generate trend(s) 155. One of the most common methods employed in generating trends (i.e., predictive models) is linear regression, which is described in further details below. Note that data collector 151 is optional here, as logs 154 can be collected by a third party entity, such as another server (e.g., data collection server 160), and transmitted to management server 150 for processing. Management system 150 and/or data collection server 160 may represent a cloud server or a cluster of cloud servers. In one embodiment, analyzer 152 analyzes trends 155 to determine current storage performance and predict what storage performance will likely be in the near future. Based on such predictions, analyzer 152 determines whether one or more of user configurations at storage system 104 should be modified in order to improve performance.

According to one embodiment, management system 150 further includes reporter 126 configured to send alerts indicating storage performance has not been performing well under the current user configurations. In one embodiment, the alerts include remedial measures recommending changes to certain user configurations at storage system 104 in order to improve storage performance.

Figure 2:
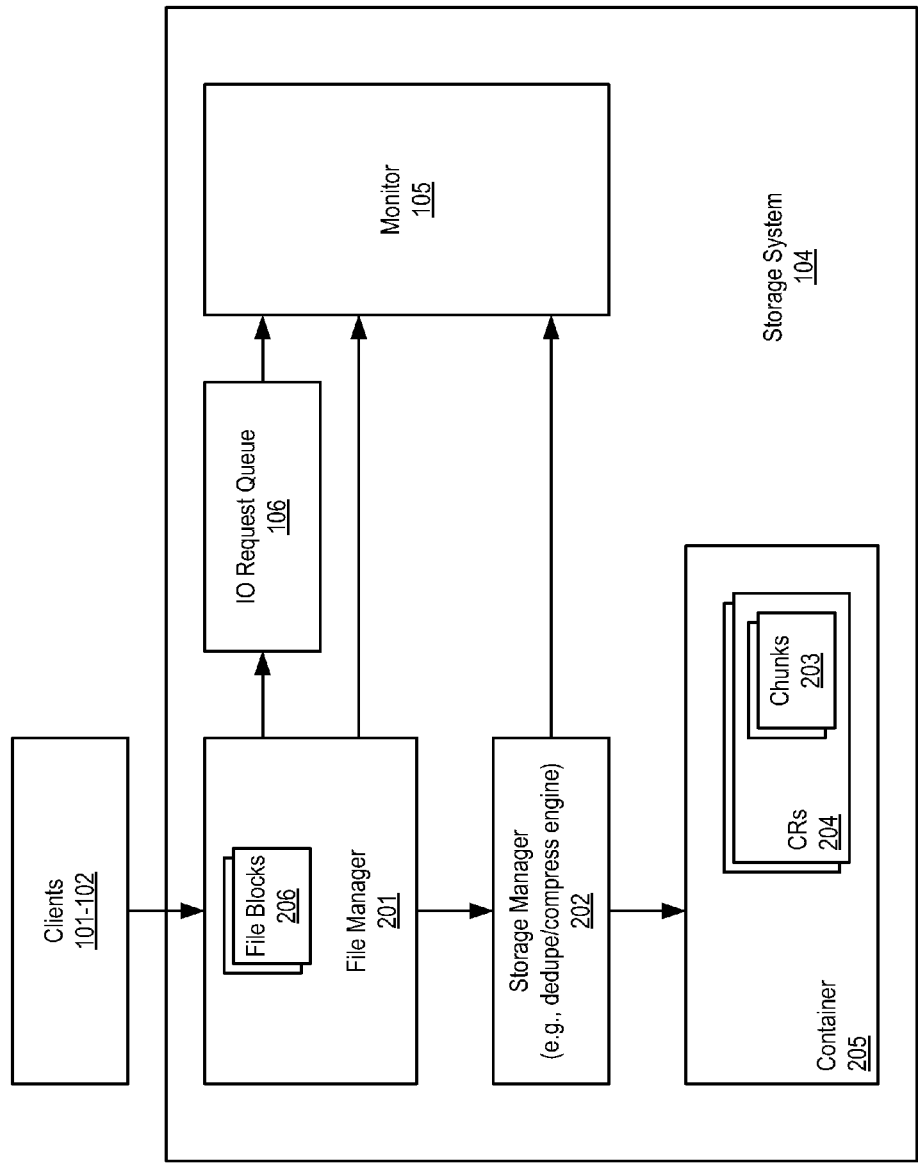
FIG. 2 is a block diagram illustrating a system according to one embodiment.

FIG. 2 is a block diagram illustrating a storage system according to one embodiment. The storage system illustrated in FIG. 2 is similar to the storage system in FIG. 1. Certain details have been omitted, however, in order to avoid obscuring the invention. Further, certain other details of storage system 104 have been added in FIG. 2 in order to better illustrate the invention. In one embodiment, storage system 104 includes input/output (IO) request queue 106 configured to store IO requests (e.g., from clients 101-102). In one embodiment, IO request queue 106 is implemented as a first-in-first-out (FIFO) buffer. In such an embodiment, IO requests in IO request queue 106 are serviced on a "first come first served" basis.

Storage system 104 further includes file manager 201, which can be executed by a processor to provide an interface to access files stored at storage system 104. File manager 201 may be part of a file system service interface. In one embodiment, file manager 201 interfaces with storage manager 202 to access file blocks 206 from storage system 104. As used herein, a file block is a data unit of each I/O request to read/write data from/to storage system 104. In one embodiment, storage manager 202 includes a deduplication storage engine, such as deduplication storage engine 107, to segment file blocks 206 into deduplication chunks 203. In one embodiment, storage manager 202 further includes a compression storage engine to further compress deduped chunks 203 into CRs 204, which are stored as part of container 205. File blocks 206, chunks 203, and CRs 204 can each have a different size.

In one embodiment, monitor 105 is configured to collect storage performance statistics including IO request service times (e.g., from file manager 201). As used herein, "IO request service time" refers to the amount of time required to service an IO request. For example, the service time of an IO request may be the amount of time between when file manager 201 receives the IO request and when file manager 201 indicates to the requestor that the IO request has been completed.

In one embodiment, monitor 105 is configured to collect storage performance statistics including IO request queue lengths (e.g., from IO request queue 106). As used herein, the "queue length" refers to how much of the queue has been utilized, representing how many IO requests are pending. For example, a longer queue length indicates that IO request queue 106 is more utilized (i.e., fuller) as compared to when IO request queue 106 has a shorter queue length. In other words, a longer queue length indicates that many IO requests are buffered in IO request queue 106.

In one embodiment, monitor 105 is configured to collect storage performance statistics including deduplication rates (e.g., from storage manager 202). A deduplication rate is derived by dividing the used logical space by the used physical space. A deduplication rate is affected by the configured dedupe chunk size. By way of example, suppose storage system 104 currently stores a first and second dedupe chunk with the content "ABCD" and "EFGH", respectively. Suppose incoming data is split into a first and second incoming chunk that contains the content "ABCX" and "EFGY", respectively. In this example, none of the currently stored dedupe chunks match the incoming chunks. Thus, deduplication fails, and as a result, the deduplication rate is decreased.

By way of further example, suppose storage system 104 currently stores a first, second, third, and fourth dedupe chunk with the content "AB", "CD", "EF", and "GH", respectively. Suppose incoming data is split into a first, second, third, and fourth incoming chunk that contains the content "AB", "CX", "EF", and "GY", respectively. In this example, 2 out of 4 incoming chunks are successfully deduped, and as a result, the deduplication rate is increased. Note that the incoming data are the same in both examples (i.e., "ABCXEFGY"), and that the data currently stored at storage system 104 are also the same in both examples (i.e., "ABCDEFGH"). The second example, however, results in a higher deduplication rate because the dedupe chunk size is smaller (i.e., half the size). Deduplicating smaller chunks, however, does require more processing resources.

In one embodiment, monitor 105 is configured to collect storage performance statistics including compression rates (e.g., from storage manager 202). A compression rate indicates how well file blocks 206 have been compressed into CRs 204. The effectiveness of compression depends on the compression algorithm that has been selected via the configuration. In one embodiment, storage system 104 provides multiple compression algorithms that a user can select through a user configuration. Some compression algorithms are more aggressive and provide better compression. These aggressive compression algorithms require more processing resources. Other compression algorithms, however, are less aggressive and do not compress data as well. These less aggressive compression algorithms require less processing resources.

As described above, IO requests are made at a data unit of file blocks 206, which can vary in size depending on the application which initiated the IO request. The IO requests are serviced by storing file blocks 206 (in the case of a write request) as CRs 204 in container 205, or by reading CRs 204 (in the case of a read request) from container 205 to construct file blocks 206. The size of CRs 204 may be the same or different from the size of file blocks 206. For example, each of file blocks 206 may comprise of multiple of CRs 204.

In one embodiment, monitor 105 is configured to collect storage performance statistics including block misalignment rates (e.g., from storage manager 202). As used herein, a "block misalignment rate" refers to how well each of file blocks 206 is evenly partitioned (i.e., divided) into CRs 204. A low block misalignment rate refers to each of file blocks 206 having a size such that it evenly divides into multiple of CRs 204. On the other hand, a high block misalignment rate refers to each of file blocks 206 having a size such that it does not evenly divide into multiple of CRs 204. By way of example, suppose each of file blocks 206 has a size of 100 bytes, and each of CRs 204 has a size of 10 bytes. In this example, the block misalignment rate is low because to serve an IO request, exactly 10 CRs 204 are accessed, totaling exactly 100 bytes. Thus, all accessed bytes are used, without any remainder/excess bytes. By way of further example, suppose each of file blocks 206 has a size of 100 bytes, and each of CRs 204 has a size of 18 bytes. In this example, the block misalignment rate is higher because to serve an IO request, 6 CRs 204 are accessed, totaling a size of 108 bytes. Thus, 8 remainder/excess bytes are accessed that are not used to construct requested file blocks 206.

In one embodiment, monitor 105 is configured to collect storage performance statistics including average IO throughput (e.g., from file manager 201). As used herein, an "average IO throughput" refers to the data rate through storage system 104, typically measured in bytes per second. It shall be understood that the average IO throughput can be measured in units other than bytes. In one embodiment, monitor 105 is configured to collect storage performance statistics including average IO operations per second (e.g., from file manager 201). As used herein, an "average IO operations per second" refers to the average number of IO operations (data or metadata) completed per second by storage system 104, typically expressed in units of operations per second (OPS). It shall be appreciated that the average IO operations can be measured in units of time other second.

In some instances, there can be a correlation between the "average IO throughput" and the "average IO operations per second" metrics. However, it is not always the case that these two metrics correlate with each other. By way of example, it is possible that storage system 104 may be performing mostly metadata IO operations. In such an example, the average IO throughput is low, but the average IO operations per second is high.

According to one embodiment, monitor 105 is configured to monitor the storage performance statistics continuously as they are changed. In an alternate embodiment, in order to reduce processing resources, one or more of storage performance statistics can be monitored periodically at predetermined time intervals. The predetermined time intervals may all be the same. Alternatively, the predetermined time intervals may be different depending on the nature of the storage performance statistics. For example, a storage performance statistic that changes frequently may be monitored at shorter predetermined time intervals in order to more accurately sample the statistic. On the other hand, a performance statistic that does not change frequently may be monitored at longer predetermined time intervals in order to conserve processing resources.

The storage performance statistics described above are for illustrative purposes, and not intended to be limitations of the present invention. Other storage performance statistics can be monitored without departing from the broader scope and spirit of the present invention.

Figure 3:
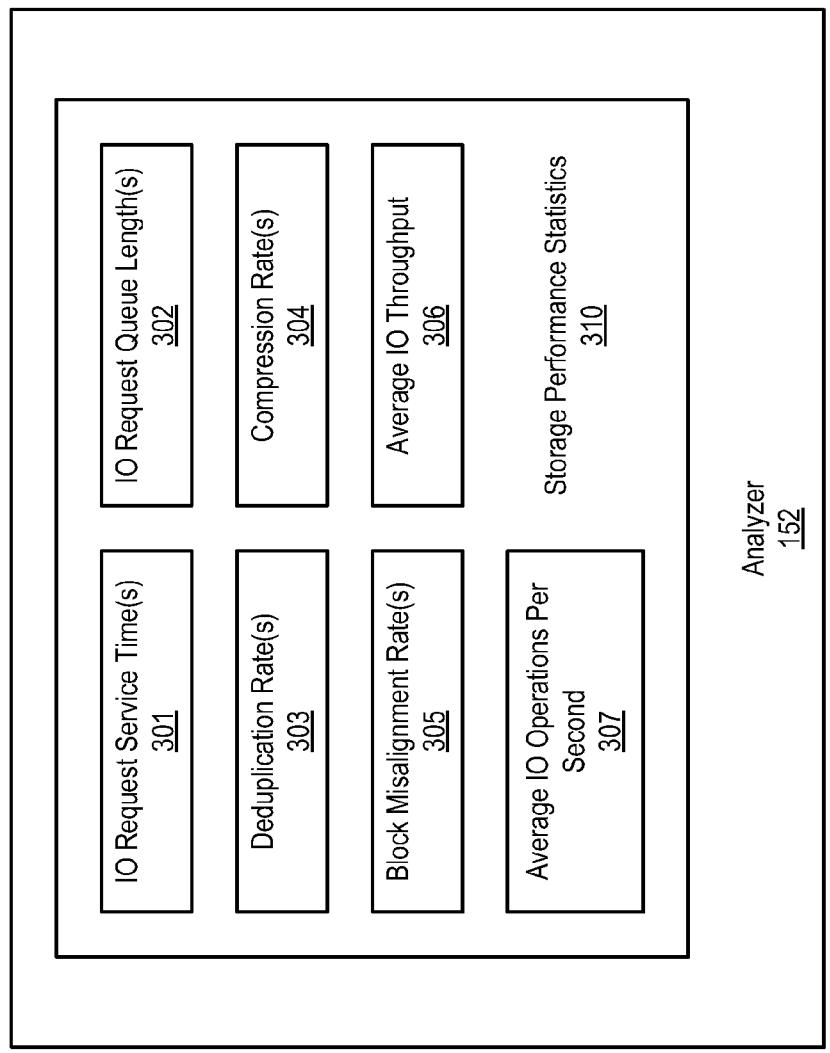
FIG. 3 is a block diagram illustrating an analyzer for analyzing storage performance statistics according to one embodiment.

FIG. 3 is a block diagram illustrating an analyzer for analyzing storage performance statistics according to one embodiment. As illustrated, analyzer 152 analyzes storage performance statistics 310, including IO request service times 301, IO request queue lengths 302, deduplication rates 303, compression rates 304, block misalignment rates 305, average IO throughput 306, and average IO operations per second (OPS) 307. Other storage performance statistics can be analyzed.

In one embodiment, analyzer 152 is configured to identify (i.e., detect) slow IO access by analyzing IO request service times 301 collected, for example, by data collector 151 and/or data collection server 160. In one embodiment, analyzer 152 is to compare collected IO request service times 301 against a predetermined service time threshold, which may be defined by a quality of service (QoS) policy. In some instances, IO request service times 301 may exceed the predetermined service time threshold, indicating storage system 104 has been servicing IO requests slower than required by the QoS policy.

IO request service times 301 may exceed the predetermined service time threshold for various reasons, for example, a configuration error at storage system 104. For example, the slow IO access may be caused by a QoS misconfiguration that grants too much priority to certain applications, and thus, the lower priority applications are starved of IO resources. Such a misconfiguration may be the result of a user failing to change the default configurations, or the result of a user changing the default configurations and unknowingly provisioned too much priority to one or more applications.

According to one embodiment, in response to determining IO request service times 301 exceed the predetermined service time threshold, analyzer 152 generates and sends an alert to reporter 126. The alert indicates to the user that IO accesses are slower than required by the QoS policy. The alert can include one or more remedial measures. For example, the remedial measure can recommend the user to change the current QoS configurations in order to allocate priority more evenly. Analyzer 152 may include as part of such a remedial measure, the application which issued the IO request that triggered the alert (e.g., the IO request that took a long time to be serviced). With such information, the user can, for example, change the QoS configuration to allocate more priority to the identified application.

In one embodiment, analyzer 152 is configured to detect slow IO request queue draining by analyzing IO request queue lengths 302 collected, for example, by data collector 151 and/or data collection server 160. In one embodiment, analyzer 152 is to compare collected IO request queue lengths 302 against a predetermined queue length threshold, which can be defined by the QoS policy. In some instances, IO request queue lengths 302 may exceed the predetermined queue length threshold, indicating storage system 104 has been draining IO requests from IO request queue 106 slower than required by the QoS policy.

IO request queue lengths 302 may exceed the predetermined queue length threshold for various reasons, for example, a configuration error at storage system 104. For example, IO request queue 106 may be draining too slowly due to a QoS misconfiguration that grants too much priority to certain applications, and thus, the lower priority applications are starved of IO resources. In such a scenario, when the lower priority IO requests are at the top of IO request queue 106, they are not serviced quick enough, and this in turn, causes IO requests at the bottom of IO request queue 106 to be stalled, even though they may have higher priority. As more IO requests are pushed into IO request queue 106, the length of IO request queue 106 becomes longer. If this persists, IO request queue 106 will become full and IO requests will be discarded.

According to one embodiment, in response to determining IO request queue lengths 302 exceed the predetermined queue length threshold, analyzer 152 generates and sends an alert to reporter 126. The alert indicates to the user that IO request queue 106 is draining slower than required by the QoS policy. The alert can include one or more remedial measures. For example, the remedial measure can recommend the user to change the current QoS configurations in order to allocate priority more evenly. Analyzer 152 may include as part of such a remedial measure, the application which issued the IO request that triggered the alert (e.g., the IO request that is at the top of IO request queue 106 when the queue length exceeded the threshold). With such information, the user can, for example, change the QoS configuration to allocate more priority to the identified application.

According to one embodiment, analyzer 152 is configured to analyze deduplication rates 303 collected, for example, by data collector 151 and/or data collection server 160. In such an embodiment, analyzer 152 is to compare collected deduplication rates 303 against one or more predetermined deduplication rate thresholds. Deduplication rates 303 may fall below the predetermined deduplication rate thresholds, indicating that the actual storage capacity being saved (if any) by deduplication are not worth wasting the processing resources being utilized in attempting to dedupe the incoming data.

The low deduplication rates may be caused by the fact that there is not much commonality in the data being stored at storage system 104. As previously described, the low deduplication rates may also be caused by the fact that the current dedupe chunk size is too large, and it is difficult to match an incoming dedupe chunk with one that is currently stored in storage system 104.

According to one embodiment, in response to determining deduplication rates 303 are below a first predetermined deduplication rate threshold, analyzer 152 generates and sends an alert to reporter 126. The alert indicates to the user that deduplication rates are low. The alert can include one or more remedial measures. For example, the remedial measure can recommend the user to change the current configuration to reduce the dedupe chunk size. As illustrated above, the probability of successfully deduplicating incoming chunks are higher when the dedupe chunk size is configured to be small.

According to one embodiment, a deduplication rate error alert includes a remedial measure recommending the user to change the configuration such that deduplication is completely disabled. Such a remedy is obviously more draconian than reducing the dedupe chunk size. Thus, in one embodiment, analyzer 152 recommends disabling deduplication only if a predetermined number of attempts at reducing the dedupe chunk size has failed to increase the deduplication rate. In an alternative embodiment, analyzer 152 recommends the user to disable deduplication only if deduplication rates 303 fall below a second predetermined deduplication rate threshold that is lower than the first predetermined deduplication rate threshold. Here, the idea is that if deduplication rates 303 fall below the second, lower deduplication rate threshold, then deduplication at storage system 104 has reached such a low rate that it is simply not worth expending any processing resources to attempt deduplication at all.

According to one embodiment, analyzer 152 is configured to analyze compression rates 304 collected, for example, by data collector 151 and/or data collection server 160. In such an embodiment, analyzer 152 is to compare collected compression rates 304 against one or more predetermined compression rate thresholds. Compression rates 304 may fall below the predetermined compression rate thresholds, indicating that the actual storage capacity being saved (if any) by compression are not worth wasting the processing resources being utilized in attempting to compress the incoming data.

The compression rates may be low for various reasons, for example, a configuration error at storage system 104. As described above, the compression rate is affected by the compression algorithm that has been selected via the configuration. Some compression algorithms are aggressive and produce better compression, but require more processing resources. Other compression algorithms are less aggressive and produce less compression, but require less processing resources. Thus, the low compression rates may be caused by the user unknowingly configuring storage system 104 to utilize a less aggressive compression algorithm.

According to one embodiment, in response to determining compression rates 304 are below a first predetermined compression rate threshold, analyzer 152 generates and sends an alert to reporter 126. The alert indicates to the user that compression rates are low. The alert can include one or more remedial measures. For example, the remedial measure can recommend the user to change the current configuration to select a more aggressive compression algorithm. Such a remedial measure may also include a suggested compression algorithm.

According to one embodiment, a compression rate error alert includes a remedial measure recommending the user to change the configuration such that compression is completely disabled. Such a remedy is obviously more draconian than selecting a more aggressive compression algorithm. Thus, in one embodiment, analyzer 152 recommends disabling compression only if a predetermined number of attempts at selecting a more aggressive compression algorithm have failed to increase the compression rate. In an alternative embodiment, analyzer 152 recommends the user to disable compression only if compression rates 304 fall below a second predetermined compression rate threshold that is lower than the first predetermined compression rate threshold. Here, the idea is that if compression rates 304 fall below the second, lower compression rate threshold, then compression at storage system 104 has reached such a low rate that it is simply not worth expending any processing resources to attempt compression at all. It may also be the case that a more aggressive compression algorithm uses more processing resources, and thus, negatively impacts the IO throughput and/or IO operations per second. In that case, it becomes a choice to reduce compression (or perhaps, disable compression altogether) or reduce IO performance requirements.

In one embodiment, analyzer 152 is configured to detect low average IO throughput by analyzing average IO throughput 306 collected, for example, by data collector 151 and/or data collection server 160. In one embodiment, analyzer 152 is to compare collected average IO throughput 306 against a predetermined IO throughput threshold, which may be defined by a quality of service (QoS) policy. Average IO throughput 306 may fall below the predetermined IO throughput threshold for various reasons, for example, a configuration error at storage system 104. For example, the low average IO throughput may be caused by a QoS misconfiguration that grants too much priority to certain applications, and thus, the lower priority applications are starved of IO resources.

According to one embodiment, in response to determining average IO throughput 306 is lower than the predetermined IO throughput threshold, analyzer 152 generates and sends an alert to reporter 126. The alert indicates to the user that the average IO throughput is lower than required by the QoS policy. The alert can include one or more remedial measures. For example, the remedial measure can recommend the user to change the current QoS configurations in order to allocate priority more evenly. In one embodiment, the remedial measure can recommend the user to change the way the storage volume attached to storage system 104 is configured (e.g., the redundant array of independent disks (RAID) configuration, the number of drives in the RAID group, etc.).

In one embodiment, analyzer 152 is configured to detect low average IO OPS by analyzing average IO OPS 307 collected, for example, by data collector 151 and/or data collection server 160. In one embodiment, analyzer 152 is to compare collected average IO OPS 307 against a predetermined IO OPS threshold, which may be defined by a quality of service (QoS) policy. Average IO OPS 307 may fall below the predetermined IO OPS threshold for various reasons, for example, a configuration error at storage system 104. For example, the low average IO OPS may be caused by a QoS misconfiguration that grants too much priority to certain applications, and thus, the lower priority applications are starved of IO resources.

According to one embodiment, in response to determining average IO OPS 307 is lower than the predetermined IO OPS threshold, analyzer 152 generates and sends an alert to reporter 126. The alert indicates to the user that the average IO throughput is lower than required by the QoS policy. The alert can include one or more remedial measures. For example, the remedial measure can recommend the user to change the current QoS configurations in order to allocate priority more evenly. In one embodiment, the remedial measure can recommend the user to change the way the storage volume attached to storage system 104 is configured (e.g., the redundant array of independent disks (RAID) configuration, the number of drives in the RAID group, etc.).

According to one embodiment, analyzer 152 is configured to analyze block misalignment rates 305 collected, for example, by data collector 151 and/or data collection server 160. In such an embodiment, analyzer 152 is to compare collected block misalignment rates 305 against a predetermined misalignment rate threshold. The misalignment rate threshold can be defined by the number of remainder/excess data units (e.g., bytes) that result from the fact that the file block size is not evenly divisible by the CR size. The misalignment rate threshold can be expressed as a raw number of remainder/excess bytes, or a percentage of the file block size or CR size. Block misalignment rates 305 may exceed the predetermined misalignment rate threshold, indicating that the file blocks and CRs are not aligned well.

Block misalignment rates may be high for various reasons, for example, a configuration error at storage system 104. It may be that the user does not know the file block size of the application, and thus failed to change the default CR size configuration to match the file block size. It may also be the case that the user did configure storage system 104 with a proper CR size at one point, but over time the application has changed its file block size, and thus no longer matches well with the configured CR size.

According to one embodiment, in response to determining block misalignment rates 305 are higher than the misalignment rate threshold, analyzer 152 generates and sends an alert to reporter 126. The alert indicates to the user that the block misalignment rate is high. The alert can include one or more remedial measures. For example, the remedial measure can recommend the user to change the current configuration to set the CR size so that it matches well with the file block size. Such a remedial measure may also include a suggested CR size which is determined based on the file block size. Also note that since IO service time, IO throughput, and IO operations per second may be affected by the amount of block misalignment, these storage performance statistics may serve as indicators of a block misalignment, and could be used as supporting statistics in analyzing the effects of block misalignment on system performance.

In one embodiment, analyzer 152 analyzes the above described storage performance statistics 310 in real-time (i.e., as they are being collected). Alternatively, one or more of storage performance statistics 310 can be post-analyzed (e.g., after they have been stored to logs 154). In one embodiment, analyzer 152 samples each collected statistic and decides, based on that one sampled statistic, whether or not to generate an alert. In another embodiment, analyzer 152 employs a less reactive approach. For example, analyzer 152 may generate trends 155 based on historical storage performance statistics. In one embodiment, analyzer 152 analyzes trends 155 to determine if storage performance has been poor. In this way, analyzer 152 filters out "spikes" or anomalies in the collected statistics and avoids sending a false alert to a user.

In one embodiment, analyzer 152 applies a predictive modeling technique (e.g., linear regressions) on trends 155 to determine current performance behavior and extrapolate/predict what the performance will be in the near future. Throughout the description, the compression rate trend is described as an exemplary trend 155. One having ordinary skill in the art would recognize, however, that linear regressions can be performed to create other trends, including, for example, deduplication rate trends, IO request service time trends, IO request queue length trends, average IO throughput trends, average IO operations per second trends, block misalignment trends, etc.

An assumption is made that compression rate is piecewise linear, e.g., for a given compression rate pattern, compression rate changes linearly with time. Periodically, the compression rate pattern shifts, altering the slope of the linear compression rate. The system for compression rate prediction determines the slope of the current compression rate pattern.

Linear regressions are calculated on historical data sets of compression rate, gradually increasing the size of the data sets by adding points backwards in time from the present. While the data set is small enough to include only the current compression rate pattern, it will register a high R squared (e.g., goodness of fit, the coefficient of determination or $R^2$, etc.), indicating the compression rate pattern is roughly linear within that time interval, with R squared increasing as the data set grows longer. Once the data set includes a previous compression rate pattern, R squared decreases, indicating the nonlinearity. The most accurate prediction for the current compression rate pattern is the linear regression that produces the peak value of R squared. The slope of this linear regression indicates the slope of the current compression rate pattern, and therefore, the rate of decrease or increase in compression rate, which can be extrapolated to determine when compression rate will degrade or improve, assuming the current behavior pattern does not change.

Figure 4A:
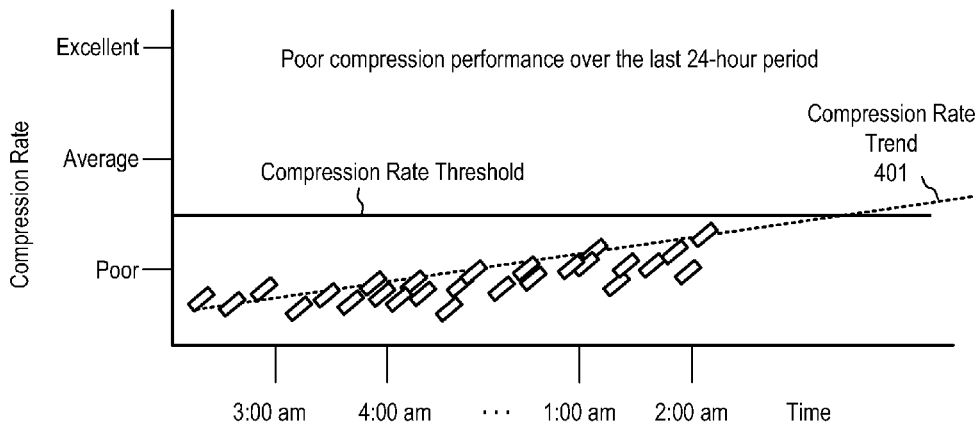
FIG. 4A is a chart illustrating a compression rate trend on a particular storage system using a predictive modeling method according to one embodiment of the invention.

FIG. 4A is a chart illustrating a compression rate trend on a particular storage system using a predictive modeling method according to one embodiment of the invention. For example, as illustrated in FIG. 4A, a linear regression is performed on the collected compression rate statistic data such as those stored as part of logs 154, using a predictive modeling method as described above. As a result, a linear slope (e.g., dash line) is determined representing compression rate trend 401 in the near future. Compression rate trend 401, for example, can be implemented as part of trends 155. Based on the graph as shown in FIG. 4A, analyzer 152 can approximately determine that although the compression rate within the last 24 hours is poor, compression rate trend 401 is increasing. Based on compression rate trend 401, analyzer 152 predicts that the compression rate will improve and rise above the predetermined compression rate threshold in the near future. In response to this prediction, analyzer 152 does not generate an alert as described above even though the current compression rate is below the predetermined compression rate threshold.

Figure 4B:
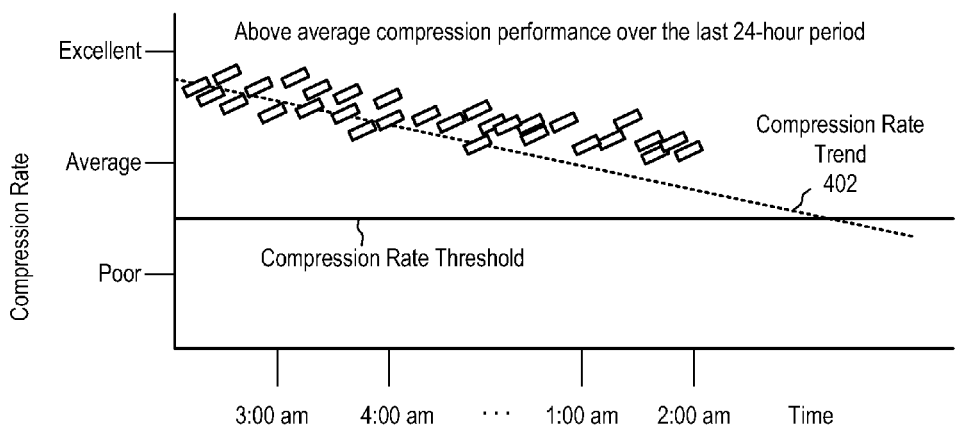
FIG. 4B is a chart illustrating a compression rate trend on a particular storage system using a predictive modeling method according to one embodiment of the invention.

FIG. 4B is a chart illustrating a compression rate trend on a particular storage system using a predictive modeling method according to one embodiment of the invention. For example, as illustrated in FIG. 4B, a linear regression is performed on the collected compression rate statistic data such as those stored as part of logs 154, using a predictive modeling method as described above. As a result, a linear slope (e.g., dash line) is determined representing compression rate trend 402 in the near future. Compression rate trend 402, for example, can be implemented as part of trends 155. Based on the graph as shown in FIG. 4B, analyzer 152 can approximately determine that although the compression rate within the last 24 hours is above average, compression rate trend 402 is decreasing. Based on compression rate trend 402, analyzer 152 predicts that the compression rate will degrade and fall below the predetermined compression rate threshold in the near future. In response to this prediction, analyzer 152 proactively generates and sends an alert as described above even though the current compression rate is not below the predetermined compression rate threshold.

Figure 4C:
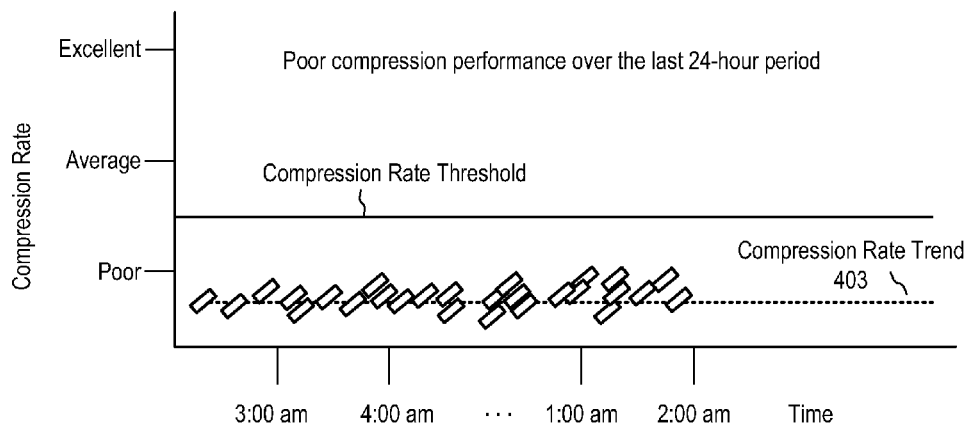
FIG. 4C is a chart illustrating a compression rate trend on a particular storage system using a predictive modeling method according to one embodiment of the invention.

FIG. 4C is a chart illustrating a compression rate trend on a particular storage system using a predictive modeling method according to one embodiment of the invention. For example, as illustrated in FIG. 4C, a linear regression is performed on the collected compression rate statistic data such as those stored as part of logs 154, using a predictive modeling method as described above. As a result, a linear slope (e.g., dash line) is determined representing compression rate trend 403 in the near future. Compression rate trend 403, for example, can be implemented as part of trends 155. Based on the graph as shown in FIG. 4C, analyzer 152 can approximately determine that the compression rate within the last 24 hours is poor, and that compression rate trend 403 is not increasing. Based on compression rate trend 403, analyzer 152 predicts that the compression rate will not rise above the predetermined compression rate threshold in the near future. In response to this prediction, analyzer 152 generates an alert as described above.

The predictive modeling method described above can be utilized to generate other trends, including for example, a trend to predict IO request service times, a trend to predict IO request queue lengths, a trend to predict average IO throughput rates, a trend to predict average IO operations per second rates, a trend to predict deduplication rates, a trend to predict block misalignment rates, etc., which can be implemented as part of trends 155. Analyzer 152 can use these trends to determine whether or not to generate alerts as described above in the text with respect to compression rate trends 401, 402, and 403.

Figure 5:
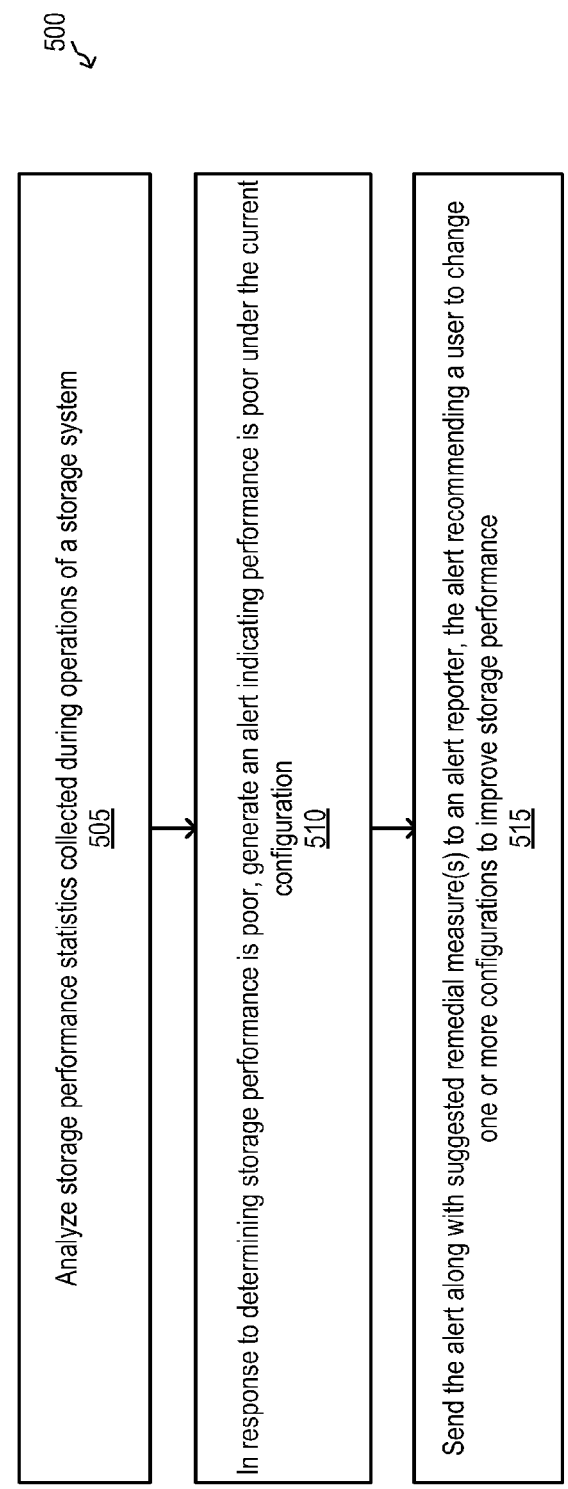
FIG. 5 is a flow diagram illustrating a method for analyzing storage performance statistics according to one embodiment.

FIG. 5 is a flow diagram illustrating method 500 for analyzing storage performance statistics according to one embodiment. For example, method 500 can be performed by management system 150, such as, for example, analyzer 152 of management system 150. Method 500 can be implemented in software, firmware, hardware, or any combination thereof. The operations of this and other flow diagrams will be described with reference to the exemplary embodiments of the other diagrams. However, it should be understood that the operations of the flow diagrams can be performed by embodiments of the invention other than those discussed with reference to these other diagrams, and the embodiments of the invention discussed with reference to these other diagrams can perform operations different than those discussed with reference to the flow diagrams.

Referring now to FIG. 5. At block 505, analyzer 152 analyzes storage performance statistics (e.g., storage performance statistics 310) collected during operations of a storage system (e.g., storage system 104). At block 510, analyzer 152, in response to determining storage performance is poor, generates an alert indicating performance is poor under the current configuration. For example, analyzer 152 determines that IO request service times 301 are higher than a predetermined service time threshold, and/or IO request queue lengths 302 exceed a predetermined queue length threshold, and/or average IO throughput is below a predetermined average IO throughput threshold, and/or average IO operations per second is below a predetermined average IO operations per second threshold, and/or deduplication rates 303 are below one or more predetermined deduplication rate thresholds, and/or compression rates 304 are below one or more predetermined compression rate thresholds, and/or block misalignment rates 305 are higher than a predetermined block misalignment rate threshold.

At block 515, analyzer 152 sends the alert along with suggested remedial measure(s) to an alert reporter (such as reporter 126), the alert recommending a user to change one or more configurations to improve storage performance. The remedial measures can be similar to those described above.

Figure 6:
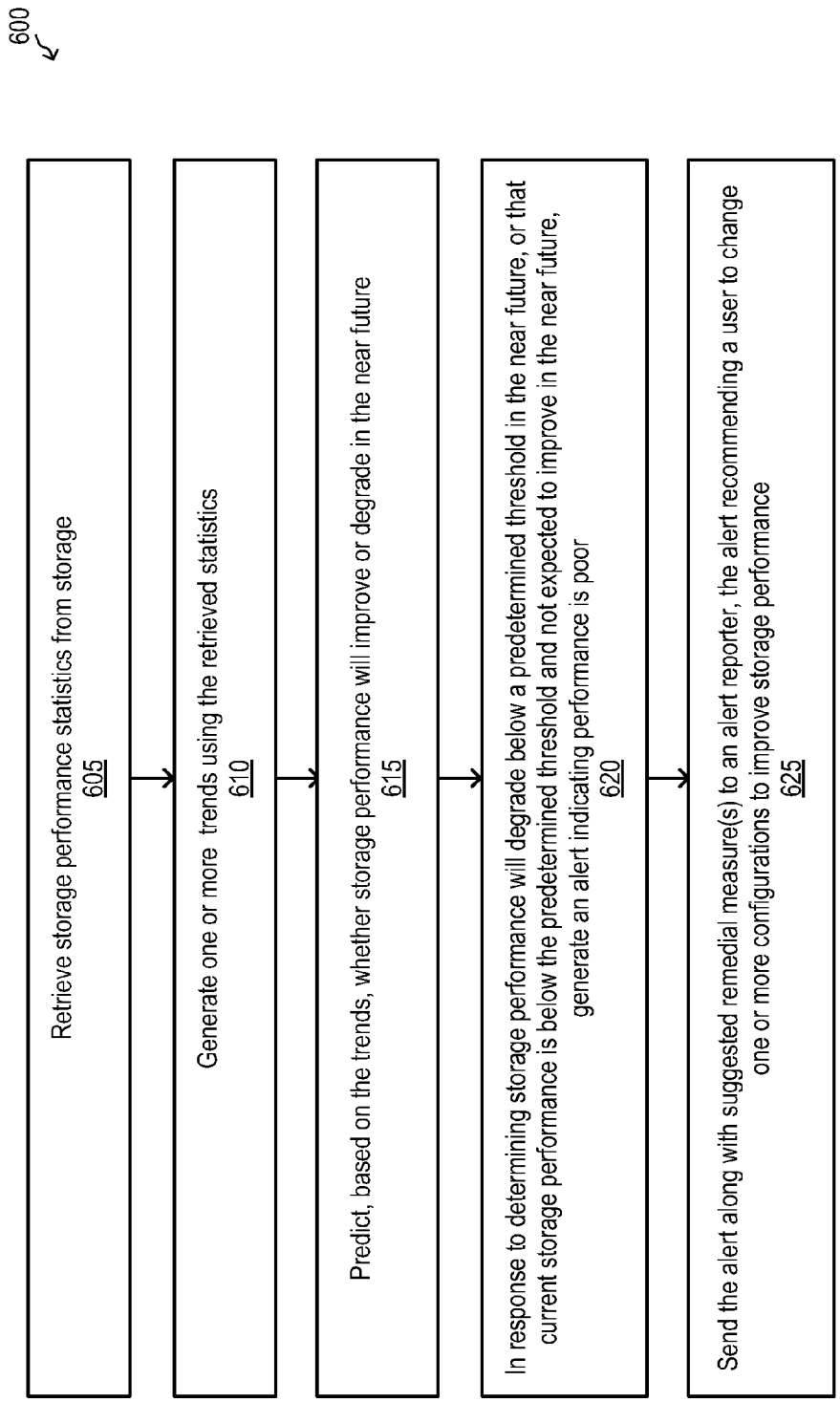
FIG. 6 is a flow diagram illustrating a method for analyzing storage performance statistics according to one embodiment.

FIG. 6 is a flow diagram illustrating method 600 for generating trends of storage performance according to one embodiment. For example, method 600 can be performed by management system 150, such as, for example, analyzer 152 of management system 150. Method 600 can be implemented in software, firmware, hardware, or any combination thereof.

Referring now to FIG. 6. At block 605, analyzer 152 retrieves storage performance statistics from storage (e.g., from logs 154). At block 610, analyzer 152 generates one or more trends (e.g., trends 155) using the retrieved statistics. At block 615, analyzer 152 predicts, based on the trend, whether storage performance will improve or degrade in the near future.

At block 620, analyzer 152, in response to determining storage performance will degrade below a predetermined threshold in the near future (e.g., compression rate trend 402), or that the current storage performance is below a predetermined threshold and not expected to improve in the near future (e.g., compression rate trend 403), generates an alert indicating performance is poor. At block 625, analyzer 152 sends the alert along with suggested remedial measure(s) to an alert reporter, the alert recommending a user to change one or more configurations to improve storage performance.

Figure 7:
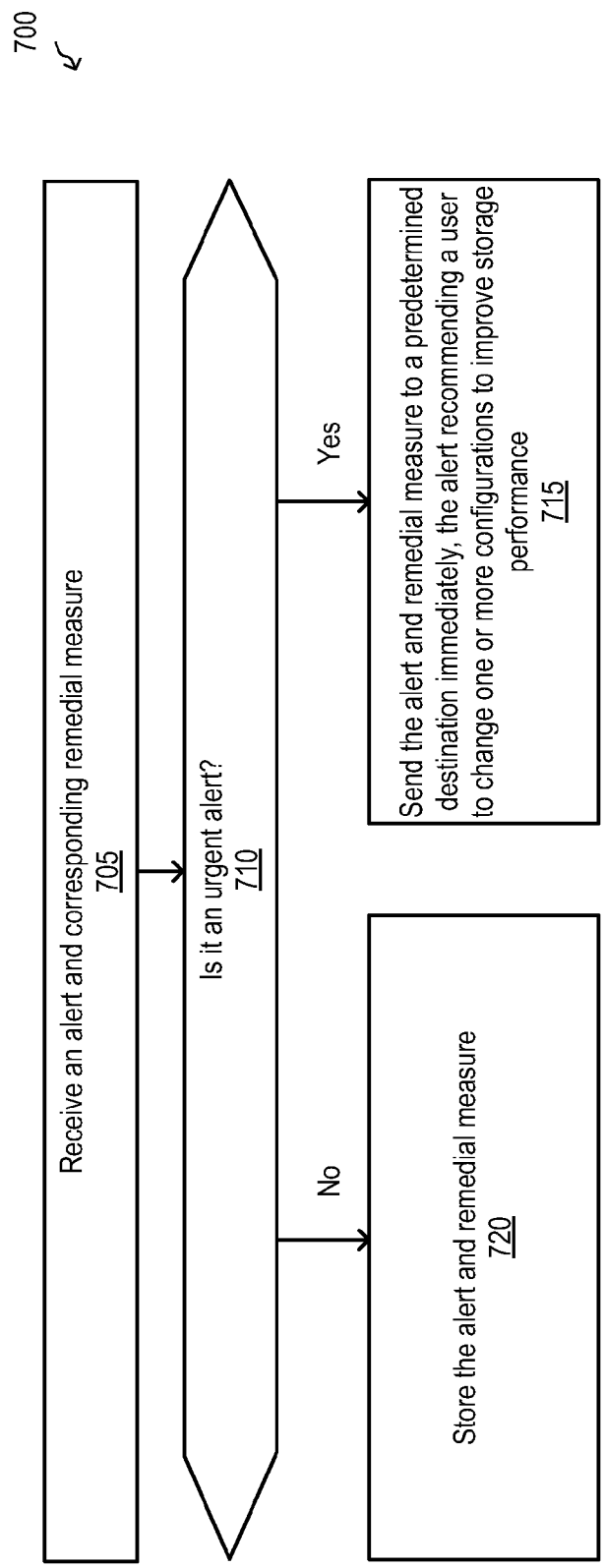
FIG. 7 is a flow diagram illustrating a method for sending alerts according to one embodiment.

FIG. 7 is a flow diagram illustrating method 700 for sending alerts according to one embodiment. For example, method 700 can be performed by management system 150, such as, for example, reporter 126 of management system 150. Method 700 can be implemented in software, firmware, hardware, or any combination thereof.

Referring now to FIG. 7. At block 705, reporter 126 receives an alert and corresponding remedial measure(s) (e.g., from analyzer 152). At block 710, reporter 126 determines whether the received alert is urgent. At block 715, in response to determining the alert is urgent, reporter 126 sends the alert and remedial measure(s) to a predetermined destination immediately, the alert recommending a user to change one or more configurations to improve storage performance. At block 720, in response to determining the received alert is non-urgent, reporter 126 stores the alert and remedial measure(s) to be sent at a later time.

Figure 8:
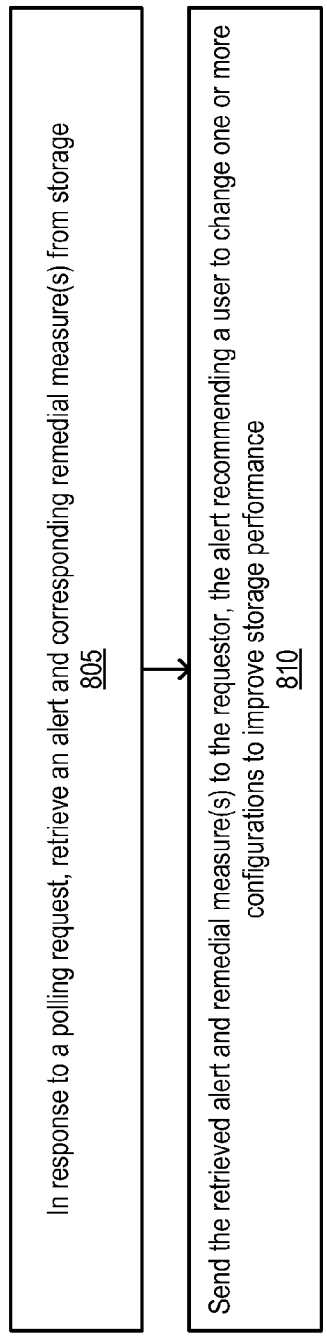
FIG. 8 is a flow diagram illustrating a method for sending alerts according to one embodiment.

FIG. 8 is a flow diagram illustrating method 800 for sending alerts according to one embodiment. For example, method 800 can be performed by management system 150, such as, for example, reporter 126 of management system 150. Method 800 can be implemented in software, firmware, hardware, or any combination thereof.

Referring now to FIG. 8. At block 805, in response to a polling request (e.g., from clients 101-102), reporter 126 retrieves an alert and corresponding remedial measure(s) from storage. At block 810, reporter 126 sends the retrieved alert and remedial measure(s) to the requestor, the alert recommending a user to change one or more configurations to improve storage performance.

Figure 9:
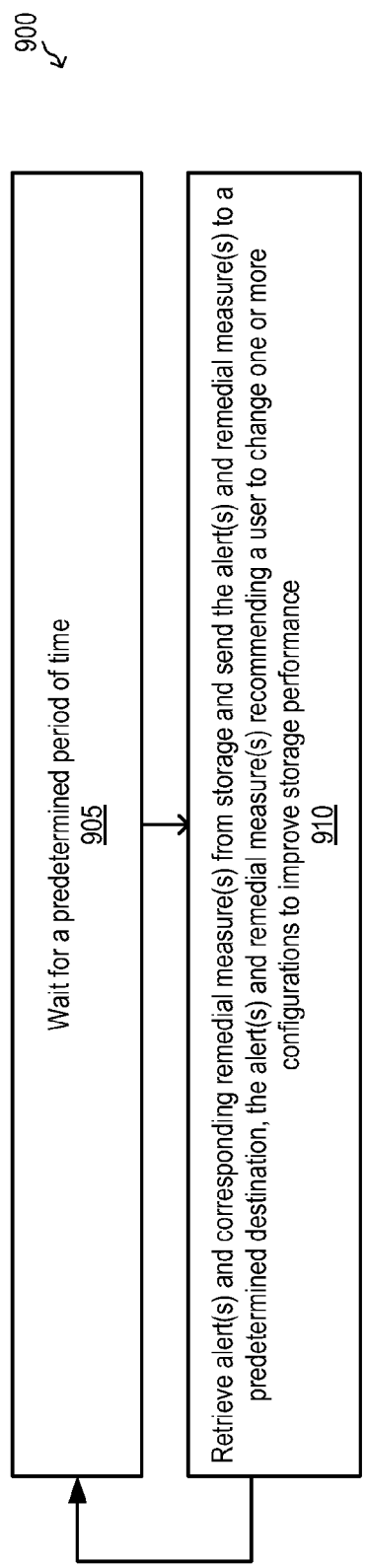
FIG. 9 is a flow diagram illustrating a method for sending alerts according to one embodiment.

FIG. 9 is a flow diagram illustrating method 900 for sending alerts according to one embodiment. For example, method 900 can be performed by management system 150, such as, for example, reporter 126 of management system 150. Method 900 can be implemented in software, firmware, hardware, or any combination thereof.

Referring now to FIG. 9. At block 905, reporter 126 waits for a predetermined period of time. At block 910, once the predetermined period of time has elapsed, reporter 126 retrieves one or more alerts and corresponding remedial measure(s) from storage, and sends them to a predetermined destination, the alerts recommending a user to change one or more configurations to improve storage performance.

Figure 10:
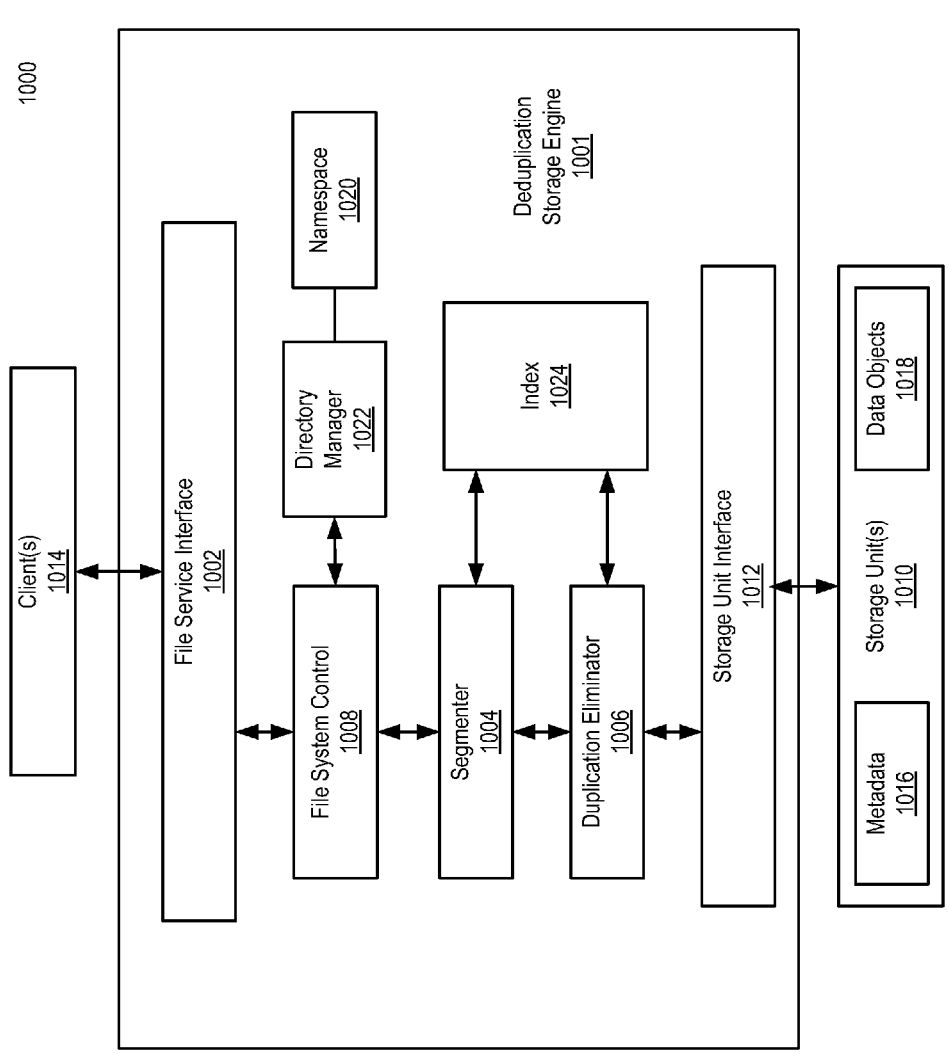
FIG. 10 is a block diagram illustrating a deduplication storage engine which can be used with embodiments of the invention.

FIG. 10 is a block diagram illustrating a deduplication storage system according to one embodiment of the invention. For example, deduplication storage system 1000 may be implemented as part of a deduplication storage system as described above, such as, for example, the deduplication storage system as shown in FIG. 1. In one embodiment, storage system 1000 may represent a file server (e.g., an appliance used to provide network attached storage (NAS) capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage system 1000 may have a distributed architecture, or all of its components may be integrated into a single unit. Storage system 1000 may be implemented as part of an archive and/or backup system such as a deduplicating storage system available from EMC® Corporation of Hopkinton, Mass.

In one embodiment, storage system 1000 includes a deduplication engine 1001 interfacing one or more clients 1014 with one or more storage units 1010 storing metadata 1016 and data objects 1018. Clients 1014 may be any kinds of clients, such as, for example, a client application, backup software, or a garbage collector, located locally or remotely over a network. A network may be any type of networks such as a local area network (LAN), a wide area network (WAN) such as the Internet, a corporate intranet, a metropolitan area network (MAN), a storage area network (SAN), a bus, or a combination thereof, wired and/or wireless.

Storage devices or units 1010 may be implemented locally (e.g., single node operating environment) or remotely (e.g., multi-node operating environment) via an interconnect, which may be a bus and/or a network. In one embodiment, one of storage units 1010 operates as an active storage to receive and store external or fresh user data, while the another one of storage units 1010 operates as a target storage unit to periodically archive data from the active storage unit according to an archiving policy or scheme.

Storage units 1010 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 1010 may also be combinations of such devices. In the case of disk storage media, the storage units 1010 may be organized into one or more volumes of redundant array of inexpensive disks (RAID). Data stored in the storage units may be stored in a compressed form (e.g., lossless compression: HUFFMAN coding, LEMPEL-ZIV WELCH coding; delta encoding: a reference to a segment plus a difference; etc.). In one embodiment, different storage units may use different compression methods (e.g., main or active storage unit from other storage units, one storage unit from another storage unit, etc.).

The metadata, such as metadata 1016, may be stored in at least some of storage units 1010, such that files can be accessed independent of another storage unit. Metadata of each storage unit includes enough information to provide access to the files it contains. In one embodiment, metadata may include fingerprints contained within data objects 1018, where a data object may represent a data segment, a compression region (CR) of data segments, or a container of one or more CRs. Fingerprints are mapped to a particular data object via metadata 1016, enabling the system to identify the location of the data object containing a segment represented by a particular fingerprint. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, the metadata information includes a file name, a storage unit identifier identifying a storage unit in which the segments associated with the file name are stored, reconstruction information for the file using the segments, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for segments in storage units, identifying specific data objects).

In one embodiment, deduplication storage engine 1001 includes file service interface 1002, segmenter 1004, duplicate eliminator 1006, file system control 1008, and storage unit interface 1012. Deduplication storage engine 1001 receives a file or files (or data item(s)) via file service interface 1002, which may be part of a file system namespace 1020 of a file system associated with the deduplication storage engine 1001. The file system namespace 1020 refers to the way files are identified and organized in the system. An example is to organize the files hierarchically into directories or folders, which may be managed by directory manager 1022. File service interface 1002 supports a variety of protocols, including a network file system (NFS), a common Internet file system (CIFS), and a virtual tape library interface (VTL), etc.

The file(s) is/are processed by segmenter 1004 and file system control 1008. Segmenter 1004, also referred to as a content store, breaks the file(s) into variable-length segments based on a variety of rules or considerations. For example, the file(s) may be broken into segments by identifying segment boundaries using a content-based technique (e.g., a function is calculated at various locations of a file, when the function is equal to a value or when the value is a minimum, a maximum, or other value relative to other function values calculated for the file), a non-content-based technique (e.g., based on size of the segment), or any other appropriate technique. In one embodiment, a segment is restricted to a minimum and/or maximum length, to a minimum or maximum number of segments per file, or any other appropriate limitation.

In one embodiment, file system control 1008, also referred to as a file system manager, processes information to indicate the segment(s) association with a file. In some embodiments, a list of fingerprints is used to indicate segment(s) associated with a file. File system control 1008 passes segment association information (e.g., representative data such as a fingerprint) to index 1024. Index 1024 is used to locate stored segments in storage units 1010 via storage unit interface 1012. Duplicate eliminator 1006, also referred to as a segment store, identifies whether a newly received segment has already been stored in storage units 1010. In the event that a segment has already been stored in storage unit(s), a reference to the previously stored segment is stored, for example, in a segment tree associated with the file, instead of storing the newly received segment. A segment tree of a file may include one or more nodes and each node represents or references one of the deduplicated segments stored in storage units 1010 that make up the file. Segments are then packed by a container manager (which may be implemented as part of storage unit interface 1012) into one or more storage containers stored in storage units 1010. The deduplicated segments may be further compressed into one or more CRs using a variation of compression algorithms, such as a Lempel-Ziv algorithm before being stored. A container may contains one or more CRs and each CR may contain one or more deduplicated segments. A container may further contain the metadata such as fingerprints, type of the data segments, etc. that are associated with the data segments stored therein.

When a file is to be retrieved, file service interface 1002 is configured to communicate with file system control 1008 to identify appropriate segments stored in storage units 1010 via storage unit interface 1012. Storage unit interface 1012 may be implemented as part of a container manager. File system control 1008 communicates (e.g., via segmenter 1004) with index 1024 to locate appropriate segments stored in storage units via storage unit interface 1012. Appropriate segments are retrieved from the associated containers via the container manager and are used to construct the requested file. The file is provided via interface 1002 in response to the request. In one embodiment, file system control 1008 utilizes a tree (e.g., a segment tree obtained from namespace 1020) of content-based identifiers (e.g., fingerprints) to associate a file with data segments and their locations in storage unit(s). In the event that a segment associated with a given file or file changes, the content-based identifiers will change and the changes will ripple from the bottom to the top of the tree associated with the file efficiently since the appropriate content-based identifiers are easily identified using the tree structure. Note that some or all of the components as shown as part of deduplication engine 1001 may be implemented in software, hardware, or a combination thereof. For example, deduplication engine 1001 may be implemented in a form of executable instructions that can be stored in a machine-readable storage medium, where the instructions can be executed in a memory by a processor.

In one embodiment, storage system 1000 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

An electronic device or a computing device (e.g., an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A computer-implemented method for monitoring and improving performance at a storage system, the method comprising:

analyzing storage performance statistics collected during operations of a storage system;

in response to determining storage performance satisfies a predetermined condition based on the analyzed storage performance statistics, determining one or more storage configuration suggestions that will likely improve a storage performance based on the analysis; and transmitting a first set of alerts to a user of the storage system indicating storage performance is poor under a current set of configurations based on the analysis, wherein at least one or more of the first set of alerts includes the one or more storage configuration suggestions to allow the user of the storage system to modify the current set of configurations in an attempt to improve the storage performance of the storage system, wherein transmitting a first set of alerts to a user of the storage system comprises, for each of the first set of alerts, determining whether an alert is urgent or non-urgent, and in response to determining the alert is urgent, sending the urgent alert to a predetermined destination immediately, the urgent alert recommending a user to change one or more configurations suggested by the urgent alert to improve the storage performance.

2. The method of claim 1, further comprising:
for each of the first set of alerts, in response to determining an alert is non-urgent, storing the non-urgent alert to be sent at a later time;
periodically retrieving a stored non-urgent alert from storage; and
sending the retrieved non-urgent alert to the predetermined destination, the non-urgent alert recommending the user to change one or more configurations suggested by the non-urgent alert to improve the storage performance.

3. The method of claim 1, further comprising:
in response to determining an input/output (IO) access request service time exceeds a predetermined service time threshold defined by a quality of service (QoS) policy, generating a configuration alert that includes a remedial measure recommended to satisfy a service time requirement specified in the QoS policy.

4. The method of claim 1, further comprising:
in response to determining an input/output (IO) request queue length exceeds a predetermined queue length threshold, generating a configuration alert that includes a remedial measure suggesting a change to one or more of current storage configurations to reduce a number of IO requests pending in the IO request queue.

5. The method of claim 1, further comprising:
in response to determining a deduplication rate is below a predetermined deduplication rate threshold, generating a deduplication configuration alert that includes a remedial measure suggesting a change to a current deduplicated chunk size configuration.

6. The method of claim 1, further comprising:
in response to determining a deduplication rate is below a predetermined deduplication rate threshold, generating a deduplication configuration alert that includes a remedial measure suggesting deduplication to be disabled.

7. The method of claim 1, further comprising:
in response to determining a compression rate is below a predetermined compression rate threshold, generating a compression alert that includes a remedial measure suggesting a change to a current compression algorithm configuration.

8. The method of claim 1, further comprising:
in response to determining a compression rate is below a predetermined compression rate threshold, generating a compression alert that includes a remedial measure suggesting compression to be disabled.

9. The method of claim 1, further comprising:
in response to determining a block misalignment rate exceeds a predetermined block misalignment threshold, generating a block misalignment alert that includes a remedial measure suggesting a change to a current compression region size configuration.

10. The method of claim 1, further comprising:
in response to determining an average input/output (IO) throughput is below a predetermined IO throughput threshold, generating a low IO throughput alert that includes a remedial measure suggesting a change to a current quality of service (QoS) configuration.

11. The method of claim 1, further comprising:
in response to determining an average input/output (IO) operations per predetermined unit of time is below a predetermined IO operations threshold, generating a low IO operations alert that includes a remedial measure suggesting a change to a current configuration of a storage volume attached to the storage system.

12. The method of claim 1, wherein analyzing storage performance statistics comprises:
storing the storage performance statistics;
generating trends based on stored storage performance statistics; and
analyzing the generated trends to determine storage performance.

13. A non-transitory computer-readable storage medium having computer instructions stored therein, which when executed by a processor, cause the processor to perform operations comprising:
analyzing storage performance statistics collected during operations of a storage system;
in response to determining storage performance satisfies a predetermined condition based on the analyzed storage performance statistics, determining one or more storage configuration suggestions that will likely improve a storage performance based on the analysis; and
transmitting a first set of alerts to a user of the storage system indicating storage performance is poor under a current set of configurations based on the analysis, wherein at least one or more of the first set of alerts includes the one or more storage configuration suggestions to allow the user of the storage system to modify the current set of configurations in an attempt to improve the storage performance of the storage system, wherein transmitting a first set of alerts to a user of the storage system comprises, for each of the first set of alerts,
determining whether an alert is urgent or non-urgent, and
in response to determining the alert is urgent, sending the urgent alert to a predetermined destination immediately, the urgent alert recommending a user to change one or more configurations suggested by the urgent alert to improve the storage performance.

14. The non-transitory computer-readable storage medium of claim 13, further comprising:
for each of the first set of alerts, in response to determining an alert is non-urgent, storing the non-urgent alert to be sent at a later time;
periodically retrieving a stored non-urgent alert from storage; and
sending the retrieved non-urgent alert to the predetermined destination, the non-urgent alert recommending the user to change one or more configurations suggested by the non-urgent alert to improve the storage performance.

15. The non-transitory computer-readable storage medium of claim 13, further comprising:
in response to determining an input/output (IO) access request service time exceeds a predetermined service time threshold defined by a quality of service (QoS) policy, generating a configuration alert that includes a remedial measure recommended to satisfy a service time requirement specified in the QoS policy.

16. The non-transitory computer-readable storage medium of claim 13, further comprising:
in response to determining an input/output (IO) request queue length exceeds a predetermined queue length threshold, generating a configuration alert that includes a remedial measure suggesting a change to one or more of current storage configurations to reduce a number of IO requests pending in the IO request queue.

17. The non-transitory computer-readable storage medium of claim 13, further comprising:
in response to determining a deduplication rate is below a predetermined deduplication rate threshold, generating a deduplication configuration alert that includes a remedial measure suggesting a change to a current deduplicated chunk size configuration.

18. The non-transitory computer-readable storage medium of claim 13, further comprising:
in response to determining a deduplication rate is below a predetermined deduplication rate threshold, generating a deduplication configuration alert that includes a remedial measure suggesting deduplication to be disabled.

19. The non-transitory computer-readable storage medium of claim 13, further comprising:
in response to determining a compression rate is below a predetermined compression rate threshold, generating a compression alert that includes a remedial measure suggesting a change to a current compression algorithm configuration.

20. The non-transitory computer-readable storage medium of claim 13, further comprising:
in response to determining a compression rate is below a predetermined compression rate threshold, generating a compression alert that includes a remedial measure suggesting compression to be disabled.

21. The non-transitory computer-readable storage medium of claim 13, further comprising:
in response to determining a block misalignment rate exceeds a predetermined block misalignment threshold, generating a block misalignment alert that includes a remedial measure suggesting a change to a current compression region size configuration.

22. The non-transitory computer-readable storage medium of claim 13, further comprising:
in response to determining an average input/output (IO) throughput is below a predetermined IO throughput threshold, generating a low IO throughput alert that includes a remedial measure suggesting a change to a current quality of service (QoS) configuration.

23. The non-transitory computer-readable storage medium of claim 13, further comprising:
in response to determining an average input/output (IO) operations per predetermined unit of time is below a predetermined IO operations threshold, generating a low IO operations alert that includes a remedial measure suggesting a change to a current configuration of a storage volume attached to the storage system.

24. The non-transitory computer-readable storage medium of claim 13, wherein analyzing storage performance statistics comprises:
storing the storage performance statistics;
generating trends based on stored storage performance statistics; and
analyzing the generated trends to determine storage performance.

25. A data processing system, comprising:
a set of one or more processors; and
a set of one or more memories to store instructions, which when executed from the set of one or more memories, cause the data processing system to
analyze storage performance statistics collected during operations of a storage system,
in response to determining storage performance satisfies a predetermined condition based on the analyzed storage performance statistics, determine one or more storage configuration suggestions that will likely improve a storage performance based on the analysis, and
transmit a first set of alerts to a user of the storage system indicating storage performance is poor under a current set of configurations based on the analysis, wherein at least one or more of the first set of alerts includes the one or more storage configuration suggestions to allow the user of the storage system to modify the current set of configurations in an attempt to improve the storage performance of the storage system, wherein transmitting a first set of alerts to a user of the storage system comprises, for each of the first set of alerts,
determining whether an alert is urgent or non-urgent, and
in response to determining the alert is urgent, sending the urgent alert to a predetermined destination immediately, the urgent alert recommending a user to change one or more configurations suggested by the urgent alert to improve the storage performance.

26. The data processing system of claim 25, wherein the set of one or more memories further store instructions, which when executed from the set of one or more memories, cause the data processing system to:
for each of the first set of alerts, in response to determining an alert is non-urgent, store the non-urgent alert to be sent at a later time;
periodically retrieve a stored non-urgent alert from storage; and
send the retrieved non-urgent alert to the predetermined destination, the non-urgent alert recommending the user to change one or more configurations suggested by the non-urgent alert to improve the storage performance.

27. The data processing system of claim 25, wherein the set of one or more memories further store instructions, which when executed from the set of one or more memories, cause the data processing system to:
in response to determining an input/output (IO) access request service time exceeds a predetermined service time threshold defined by a quality of service (QoS) policy, generate a configuration alert that includes a remedial measure recommended to satisfy a service time requirement specified in the QoS policy.

28. The data processing system of claim 25, wherein the set of one or more memories further store instructions, which when executed from the set of one or more memories, cause the data processing system to:
in response to determining an input/output (IO) request queue length exceeds a predetermined queue length threshold, generate a configuration alert that includes a remedial measure suggesting a change to one or more of current storage configurations to reduce a number of IO requests pending in the IO request queue.

29. The data processing system of claim 25, wherein the set of one or more memories further store instructions, which when executed from the set of one or more memories, cause the data processing system to:
in response to determining a deduplication rate is below a predetermined deduplication rate threshold, generate a deduplication configuration alert that includes a remedial measure suggesting a change to a current deduplicated chunk size configuration.

30. The data processing system of claim 25, wherein the set of one or more memories further store instructions, which when executed from the set of one or more memories, cause the data processing system to:

in response to determining a deduplication rate is below a predetermined deduplication rate threshold, generate a deduplication configuration alert that includes a remedial measure suggesting deduplication to be disabled.

31. The data processing system of claim 25, wherein the set of one or more memories further store instructions, which when executed from the set of one or more memories, cause the data processing system to:

in response to determining a compression rate is below a predetermined compression rate threshold, generate a compression alert that includes a remedial measure suggesting a change to a current compression algorithm configuration.

32. The data processing system of claim 25, wherein the set of one or more memories further store instructions, which when executed from the set of one or more memories, cause the data processing system to:

in response to determining a compression rate is below a predetermined compression rate threshold, generate a compression alert that includes a remedial measure suggesting compression to be disabled.

33. The data processing system of claim 25, wherein the set of one or more memories further store instructions, which when executed from the set of one or more memories, cause the data processing system to:

in response to determining a block misalignment rate exceeds a predetermined block misalignment threshold, generate a block misalignment alert that includes a remedial measure suggesting a change to a current compression region size configuration.

34. The data processing system of claim 25, wherein the set of one or more memories further store instructions, which when executed from the set of one or more memories, cause the data processing system to:

in response to determining an average input/output (IO) throughput is below a predetermined IO throughput threshold, generate a low IO throughput alert that includes a remedial measure suggesting a change to a current quality of service (QoS) configuration.

35. The data processing system of claim 25, wherein the set of one or more memories further store instructions, which when executed from the set of one or more memories, cause the data processing system to:

in response to determining an average input/output (IO) operations per predetermined unit of time is below a predetermined IO operations threshold, generate a low IO operations alert that includes a remedial measure suggesting a change to a current configuration of a storage volume attached to the storage system.

36. The data processing system of claim 25, wherein analyzing storage performance statistics comprises the data processing system to:

store the storage performance statistics;

generate trends based on stored storage performance statistics; and analyze the generated trends to determine storage performance.

* * * * *